(12) United States Patent
Ripkens et al.

(10) Patent No.: US 7,921,984 B2
(45) Date of Patent: Apr. 12, 2011

(54) CONVEYING ARRANGEMENT FOR CONVEYING PACKAGES OR GROUPS OF BEVERAGE BOTTLES OR CONTAINERS, AND A METHOD OF OPERATION THEREOF

(75) Inventors: Hans-Gerd Ripkens, Goch (DE); Thomas Nitsch, Kleve (DE); Josef Düpper, Bedburg-Hau (DE)

(73) Assignee: KHS AG (DE)

( * ) Notice: Subject to any disclaimer, the term of this patent is extended or adjusted under 35 U.S.C. 154(b) by 90 days.

(21) Appl. No.: 12/499,985

(22) Filed: Jul. 9, 2009

(65) Prior Publication Data
US 2010/0170771 A1 Jul. 8, 2010

Related U.S. Application Data

(63) Continuation-in-part of application No. PCT/EP2007/011005, filed on Dec. 14, 2007.

(30) Foreign Application Priority Data

Jan. 13, 2007 (DE) .......................... 10 2007 001 973

(51) Int. Cl.
*B65G 47/46* (2006.01)
(52) U.S. Cl. .................................. 198/448; 198/370.03
(58) Field of Classification Search ............. 198/370.03, 198/447, 448, 449
See application file for complete search history.

(56) References Cited

U.S. PATENT DOCUMENTS

| 3,735,867 | A | * | 5/1973 | Vanderhoof et al. | .......... 209/586 |
| 3,774,748 | A | | 11/1973 | Dederer et al. | |
| 4,138,008 | A | | 2/1979 | Del Rosso | |
| 4,946,022 | A | | 8/1990 | Davis et al. | |
| 6,419,073 | B1 | | 7/2002 | Piron | |
| 6,966,423 | B2 | * | 11/2005 | Monti | .......................... 198/449 |

(Continued)

FOREIGN PATENT DOCUMENTS

| DE | 101 45 542 | 4/2003 |
| EP | 0 492 922 | 7/1992 |
| JP | 2004 026490 | 1/2004 |
| WO | WO 2004/092042 | 10/2004 |

OTHER PUBLICATIONS

International Search Report PCT/EP2007/011005 and English translation thereof.
International Preliminary Report on Patentability PCT/EP2007/011005 and English translation thereof.

*Primary Examiner* — Mark A Deuble
(74) *Attorney, Agent, or Firm* — Nils H. Ljungman & Associates

(57) ABSTRACT

A conveying arrangement for conveying packages or groups of beverage bottles or containers, and a method of operation thereof. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

20 Claims, 4 Drawing Sheets

U.S. PATENT DOCUMENTS

| | | | |
|---|---|---|---|
| 7,431,140 B2 * | 10/2008 | Tarlton | 198/370.02 |
| 7,503,447 B2 * | 3/2009 | Ford | 198/370.03 |
| 2004/0089514 A1 | 5/2004 | Henson et al. | |
| 2005/0103598 A1 * | 5/2005 | Monti | 198/448 |
| 2010/0025189 A1 * | 2/2010 | Muller | 198/418.1 |

* cited by examiner

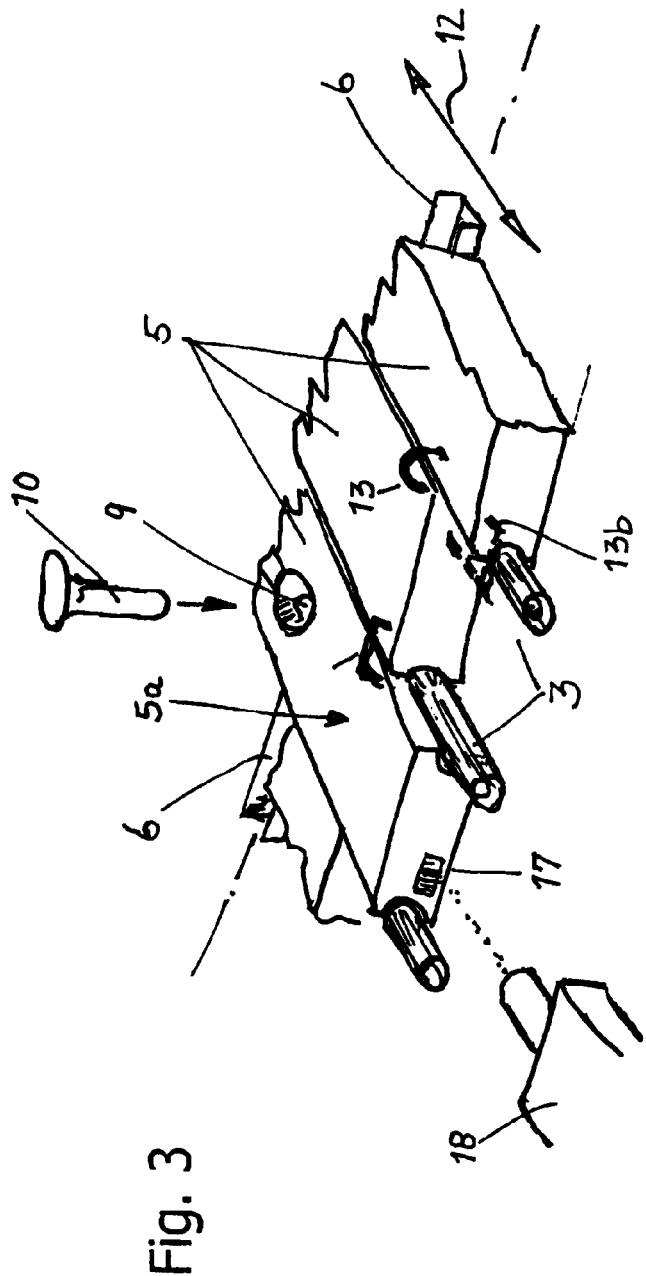
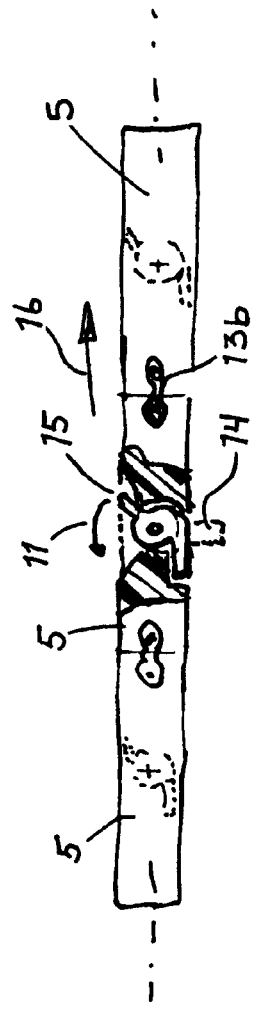
Fig. 3
Fig. 4

CONVEYING ARRANGEMENT FOR CONVEYING PACKAGES OR GROUPS OF BEVERAGE BOTTLES OR CONTAINERS, AND A METHOD OF OPERATION THEREOF

CONTINUING APPLICATION DATA

This application is a Continuation-In-Part application of International Patent Application No. PCT/2007/011005, filed on Dec. 12, 2007, which claims priority from Federal Republic of Germany Patent Application No. DE 10 2007 001 973.6, filed on Jan. 13, 2007. International Patent Application No. PCT/EP2007/011005 was pending as of the filing date of this application. The United States was an elected state in International Patent Application No. PCT/EP2007/011005.

BACKGROUND

1. Technical Field

The present application relates to a conveying arrangement for conveying packages or groups of beverage bottles or containers, and a method of operation thereof. The present application further relates to a device, or conveyer arrangement for bringing together of a plurality of containers tied together, or bundles or groups of containers, such as mini containers, or the like receptacles, in accordance with at least two conveying paths that feed the plurality of containers, or bundles or groups of containers to be brought together to the device and a conveying path for transporting the plurality of containers, or bundles or groups of containers from the device, and the device being provided with poles or rods that are operated by a chain arrangement, with the chains being disposed at the outer sides and continuously circulating, and with on and/or between the poles or rods arranged, adjustable carrier plates, and between the upper portion of the chain arrangement and the lower portion of the chain arrangement of the circulating chain conveyor and pole conveyor, there are arranged guide rails, or the like guide structures that are configured for carrying out a transverse movement of the individual carrier plates.

In other words, and in accordance with at least one possible embodiment of the present application, the conveyor arrangement of the present application comprises poles or rods which poles or rods may be controlled by a chain arrangement. The chain arrangement has chains that are located on the outer ends of the poles or rods or on the sides of the conveyor system. The chains can be circulated to move the poles or rods. The conveyor arrangement comprises adjustable carrier plates which are disposed between these poles or rods. The conveyor arrangement also has guide rails. The guide rails are located between an upper portion and a lower portion of the chain arrangement of both the circulating chain conveyor and pole or rod conveyors.

2. Background Information

Background information is for informational purposes only and does not necessarily admit that subsequently mentioned information and publications are prior art.

It is known to gather together units comprising a plurality of containers, or bundles or groups of containers which arrive on different feeder conveyors and to assemble them into a coherent transport unit, with the assembly being done in gathering arrangements, or combining arrangements. Such arrangements, also referred to as combiners, often are comprised of a large number of chain-mounted transport members, for example, rods, slats, or the like structures, with the chains being disposed laterally of the conveyer at the respective ends of the transport members, which chains and the associated transport members are circulating endlessly or continuously; and on which transport members, or, respectively, between the transport members there are adjustable carrier plates. Furthermore, when for example, two feeder conveyers are employed to supply the objects to the combining device, to one of the feeder conveyers there is assigned usually a certain number of carrier plates of the combining device, or conveyer system, and with a gap thereto, on the other side there is assigned a suitable number of carrier plates for the transport containers, whereby the carrier plates are configured to be disposed so as to be laterally shifted, such that at the outlet terminus of the device, when the bundles or groups of containers are transferred to a single conveying path, and the carrier plates are configured to form a closed group, or assembly of carrier plates, which assembly is again separated in the lower portion of the conveyer into predetermined subdivisions of carrier plates.

A special disadvantage of the known devices resides therein that due to lateral shifting of the carrier plates, an item, such as containers comprising, for example, small receptacles, or a package unit, such as a carton or the like container, which item or package unit is positioned on and straddling several plates, will be subject to turning to such an extent that the turned item will be presented skewed at an angle at the exit terminus of the device, which angle or position is contrary to the angle or position established at the entrance terminus of the device. This detriment needs to be addressed by additional arrangements that are configured and disposed to perform a rotating or swinging movement so as to bring the improperly positioned item into the position which may be necessary and/or desired for further conveying, or to bring them into the desired other transport position or orientation.

Another disadvantage of the known solutions may be in the fact that the carrier, or transport plates assigned in sections to a conveying path may offer or provide a total surface area in each case which corresponds to the greatest possible base area or extent of the products to be transported. If, for instance, many smaller bundles or groups of containers of containers, are brought together, large unused support surfaces are operationally moved, so that the conveyor capacity that is usually in conformity with the largest possible object may often be chosen so as to be too slow.

OBJECT OR OBJECTS

A task of the present application is the creation of a solution with which, on the one hand, twisting, or turning of the introduced object is avoided, restricted, and/or minimized between delivery onto the combining device and the subsequent delivery onto the downstream conveying system or continuing transport device, and at the same time an easy adaptation to a plurality of differently sized containers, or bundles, or groups of containers to be processed is substantially promoted or essentially guaranteed.

SUMMARY

With a device of the type as described in the foregoing this task is solved according to the present application by a device for bringing together of a plurality of containers, or bundles, or groups of containers, such as for instance, packaging units, small containers, carrier trays, or such like receptacles, with at least two conveying paths that feed the plurality of containers, or bundles, or groups of containers to be brought together to the device and a conveying path for transporting the plurality of containers, or bundles, or groups of containers from the device, and the device being provided with poles or rods that are operated by a chain arrangement, with the chains being disposed at the outer sides and continuously circulating, and with on and/or between the poles or rods arranged adjustable carrier plates, and between the upper portion of the chain arrangement and the lower portion of the chain arrangement of the circulating chain conveyor and pole conveyer, there are arranged guide rails, or the like guide structures that are configured for carrying out a transverse movement of the individual carrier plates. At least a portion of the carrier plates is provided with replaceable intervention elements that are configured to be operatively disposed in the guide rails and that adjacent carrier plates are equipped with fastening means for the formation at one another of larger carrier plate units.

In other words, and in accordance with at least one possible embodiment of the present application, the conveyor arrangement is configured to bring together a plurality of bundles (or groups of containers or products), such as bottles, boxes or packages. The conveyor arrangement comprises at least two conveying paths or upstream paths or upstream conveying paths. The at least two conveying paths may feed the bundles or groups of containers to a downstream conveying path of the conveyor arrangement. The downstream conveying path transports the bundles or groups of containers out of the conveyor arrangement. The conveyor arrangement further comprises poles or rods that may be moved by a chain arrangement. The chains of the chain arrangement may be disposed at the outer sides of the conveyor arrangement. The chains are configured to circulate continuously during operation of the conveyor arrangement. Adjustable carrier plates are disposed on the poles or rods. Guide rails or other guide structures may be positioned between an upper portion and a lower portion of the circulating chain arrangement on one side of the conveyor arrangement, and also between the upper portion and lower portion of the circulating chain arrangement on the opposite side of the conveyor arrangement. The guide rails are configured to guide the individual carrier plates in a transverse directional movement. Some or several of the carrier plates comprise u-shaped clamps or plugs that are configured to be disposed in the guide rails. The carrier plates may also comprise fastening structures which permit the fastening of adjacent carrier plates to one another for the formation of larger carrier plate areas or groups of carrier plates.

At least a portion, or group of the carrier plates is provided with replaceable intervention elements that are configured to be operatively disposed in the guide rails and that neighboring carrier plates are configured to be joined, so as to provide correspondingly larger transport units in which the pertaining plates are arranged adjacent to one another, so that such a configured arrangement substantially essentially ensures or promotes that from a given number of carrier plates, there can be established transport units of the desired size; and one of the carrier plates, usually that carrier plate that is positioned at the center of gravity of the unit, is provided with an intervention element which substantially essentially ensures or promotes the lateral movement by contact with the guide rails. Thus, a unit area is moved without the relative position of the individual sub-elements being compromised, so that, furthermore, a turning of the object located on the support surface is substantially precluded.

In other words, and in accordance with at least one possible embodiment of the present application, at least some of the carrier plates comprise guide elements that are configured to be disposed in or on the guide rails. Carrier plates that are disposed adjacent to one another are configured to be attached to one another so that the carrier plates may form larger transport units, or carrier plate areas. Each carrier plate area comprises a plurality of carrier plates. A plurality of carrier plates may be fastened together to produce transport units of a desired or predetermined size or length. In one possible embodiment, for example, one carrier plate area may comprise five adjacent carrier plates. In another possible embodiment, for example, one carrier plate area may comprise ten carrier plates. However, other possible embodiments of the carrier plate area may comprise any other number of carrier plates. The number of carrier plates in a carrier plate group or unit may be selected based on the size dimensions of the group of containers or packages to be conveyed thereon. For example, a six-pack of 20-ounce bottles covers less overall area than would, for example, a 24-pack of 12-ounce cans. Accordingly, the carrier plate group or unit could be adjusted in size to be larger or smaller in order to accommodate the different sized groups of containers. In one possible embodiment, the carrier plate that is at the center of the carrier plate area comprises a guide element. The guide element essentially ensures or promotes the movement of the carrier plates that is transverse to the direction of transport by contact with the guide rails. To further explain, in operation the guide elements contact the guide rails, which thereby causes the carrier plate or plates connected to the guide element to shift in a movement transverse to the direction of transport. The carrier plates transport the product by moving in the direction of transport as they simultaneously move transversely thereto. Thus a carrier plate area moves with each of the individual carrier plates moving together as a whole or as one flat surface, as opposed to each carrier plate in the carrier plate area moving independently.

In other conveyor systems that comprise, for example, two separate, parallel input conveyors that merge into one single output conveyor, the two conveyors are usually merged in a merge area. The merge area often utilizes a conveyor system in which individual slats or plates make up a conveyor surface on which packages or groups of containers may be moved. Since the single output conveyor is not aligned with or is disposed at an offset with respect to the two input conveyors, the conveyor system in the merge area must execute both a forward movement in a transport direction, as well as a sideways movement in a direction transverse to the transport direction. The combined forward and sideways movements result in an essentially diagonal movement of the groups of containers from the two input conveyors to the single output conveyor. To perform this diagonal movement, each individual slat or plate is moved gradually transversely as it is moved forward. Therefore, in operation, the slats or plates are first spaced in two separate groups, one group each being aligned with a corresponding one of the two input conveyors. A package or group of containers is then moved on to the group of slats, wherein the package or group of containers generally stretches across two or more slats since the group of containers is generally larger than a single slat. At that time, the group of slats is only moved in the forward, transport direction parallel to their corresponding input conveyor. Once the package or group of containers is fully supported by the group of slats, the individual slats commence a sideways movement. To further explain, each individual slat reaches a point at which the sideways or transverse movement begins, at which point the individual slat begins the combined sideways and forward movements, that is, the diagonal movement. As a result, each individual slat is moved sideways or transversely prior to the next individual slat following subsequent thereto. The individual slats of each group of slats therefore become repositioned in a staggered or offset manner with respect to one another. Since the package or group of containers is supported by multiple slats, as each individual slat is moved sideways with respect to the next slat trailing behind it, the group of containers is usually pulled slightly by the transversely moving slat, thereby generating a slight rotation of the package or group of containers on the conveyor formed by the group of slats. Further, as each individual slat is moved sideways, the rotation of the package or group of containers is proportionately increased. For example, if a package or group of containers stretches across a large number of slats, the rotation of the package or group of containers could be substantial. This rotation of the package or group of containers is undesirable as it prevents the desired merging of the packages or groups of containers from the two input conveyors, that is, the packages or groups of containers are no longer aligned with one another but are disposed at an angle with respect to one another. As a result, when the two streams of packages or groups of containers join, at the end of the merge area, the packages or groups of containers must be turned back by a separate turning mechanism to the desired orientation or alignment with respect to one another so as to permit merging of the packages or groups of containers in a desired alignment or format.

In a conveyor arrangement in accordance with at least one possible embodiment of the present application, in operation the packages or groups of containers essentially are maintained in the same desired orientation with respect to one another as they move on their conveyor paths, thereby eliminating the need for a separate turning mechanism. To accomplish this, a predetermined number of carrier plates are attached to one another by fastening structures, and thus form a carrier plate unit to transport the packages or groups of containers downstream. The carrier plate units transport the packages or groups of containers in the direction of transport as the carrier plate units simultaneously or substantially simultaneously move toward the center of the conveyor arrangement in a direction transverse to the direction of transport. In such an embodiment, the individual carrier plates are all moved transversely at the same time as a single unit and do not become offset or changed in position with respect to one another. Since the individual carrier plates essentially do not change in position with respect to one another, the pulling and rotating of the packages or groups of containers discussed above is essentially prevented or minimized. As a result, the packages or groups of containers are moved in an angled direction toward one another essentially without changing the orientation of the packages or groups of containers with respect to one another. The packages or groups of containers therefore do not need to be turned or reoriented prior to joining at the end of the merge area. The packages or groups of containers are essentially maintained in essentially the same orientation with respect to one another on the carrier plate units from the point of entry into the merge area, through the merging of the two conveyor paths in the merge area, to the point of exit out of the merge area into a single conveyor path.

Arrangements of the present application are further described in the possible embodiments. Thus, it can be suitable to provide replaceable intervention elements in the carrier plates, for example, plugs, or guide pins which are inserted directly through the upper side of the relevant carrier plates and which plugs, or intervention elements are, for instance, by means of a bayonet-type connection operatively connected, or secured in the relevant element of the carrier plate. Such a possibility is of advantage when re-fitting, or changing the plate sizes, or operation, for example, to take into account different sizes of containers, does not arise very often, so that a necessary and/or desired change can be carried out manually.

Another possibility comprises for example, in the configuration of the intervention elements such that they comprise guide arm structures that can be swung from the underside of the carrier plates, the configuration of such guide arm structures comprising formations that can be used for automated implementation of the connecting motion and the releasing motion of the guide arm structures.

In order so as to unite single carrier plates into larger units or entities, there is further provided that for fastening suitable, for example, u-shaped intervention elements are provided that have generally the configuration of a clamp arrangement, which fastening clamps can be inserted laterally.

Also with this configuration there exists the possibility that the fastening clamps show formations that allow a manipulation by robot apparatus which automatically set, for instance, the clamps of the desired number at the beginning of the combining arrangement and remove the clamps again at the downward end of the combining device, or station.

Every carrier plate can be provided, in accordance with the present application, for example, with a marking, like a barcode, or such like indicia that enable automation, by means of a corresponding computer program, of the bringing together of the surfaces of the individual carriers plates as an operative unit which plates are coordinated, or aligned in conformity with the transported objects as brought to the combining device.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Further features, details and advantages of the present application are described in the following with reference to drawings, in which:

FIG. 3 shows a simplified, exploded view of a part of several carrier plates that are united for cooperation;

FIG. 4 shows a simplified side elevational view of the frontal ends of a cooperative unit of carrier plates, partially in section.

DESCRIPTION OF EMBODIMENT OR EMBODIMENTS

Figure 1:
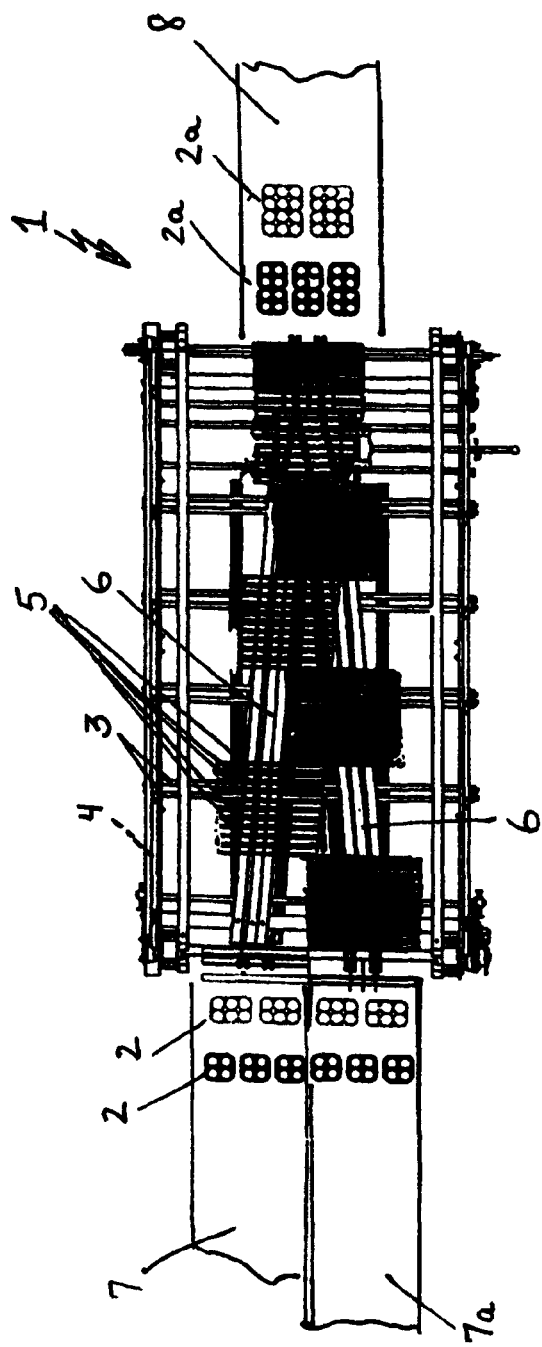
FIG. 1 shows a top plan view onto a gathering arrangement in accordance with the present application.
Figure 2:
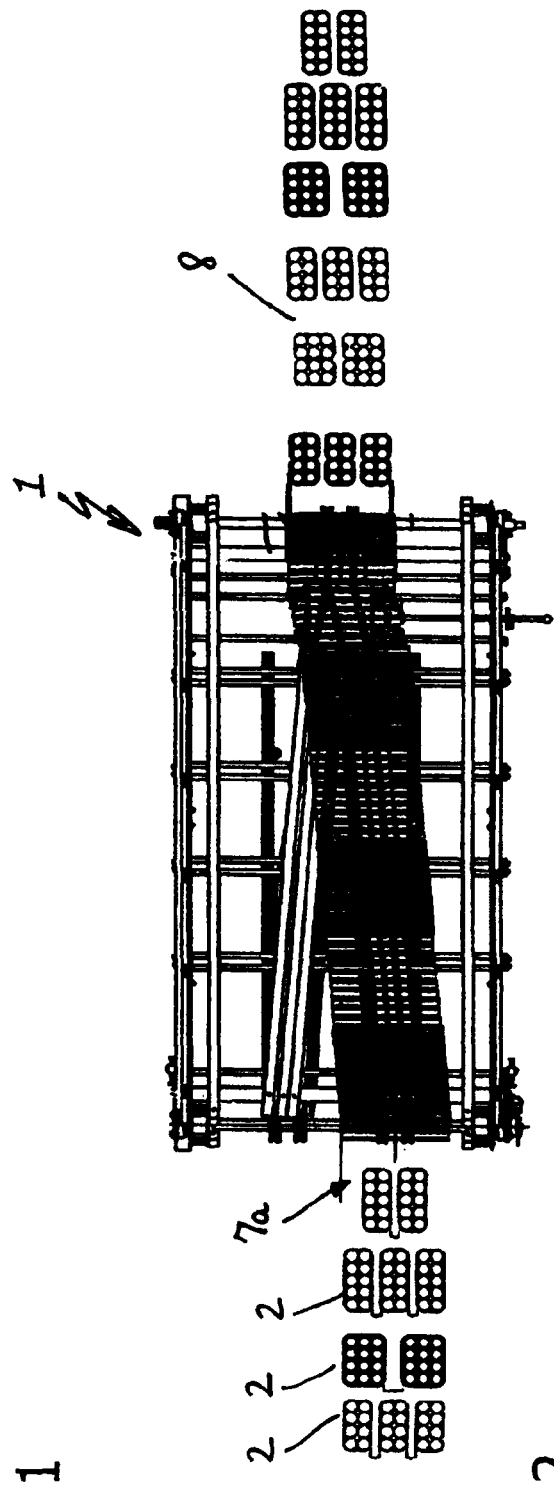
FIG. 2 shows a top plan view of a gathering arrangement in which the individual carrier plates are disposed in accordance with the state of the art.

A device, or arrangement for bringing together of a plurality of containers, or bundles or groups of containers 2 is generally identified by reference numeral 1; this arrangement serves to take bundles or groups of containers 2 and to combine, or present these bundles or groups of containers 2 as new bundles or groups of containers 2a, hereinafter also referred to as downstream bundles or groups of containers 2a; the device comprises essentially a transport-member chain conveyer system, or, respectively, a chain conveyer system wherein there is continuously circulated a plurality of transport members, such as, for example, rods, slats, or the like structures, or poles or rods 3 that are disposed in parallel or essentially parallel with respect to one another and transversely with respect to the direction of conveying, these poles or rods 3 being driven, or transported by chains 4 that are disposed, respectively, at the outer ends of the poles or rods 3, or the sides of the conveyer system, which chains 4 are shown schematically and not in greater detail. In FIG. 1 and FIG. 2 a portion of the poles or rods 3 is illustrated.

Between the poles or rods 3, or on the poles or rods 3 there are positioned carrier plates 5 that are configured and disposed to be moved transversely; the carrier plates 5 comprise guides, which by way of rails, or, respectively, guide tracks 6, that are positioned at an angle with respect to one another, and the carrier plates 5 are configured to be disposed, or to be shifted from a first position illustrated on the left side in FIG. 1, that shows the carrier plates 5 in a position closer to the lateral, or outer perimeter of the device 1, into a second position in which the carrier plates 5 are disposed more centrally as is shown on the right side of FIG. 1, resulting in the repositioning of the a plurality of containers, or bundles or groups of containers 2 such that they are pushed together coming from the first feeder path 7 or 7a to a central transport path 8 on which they continue the movement to a point further downstream of the device 1.

Figure 1A:
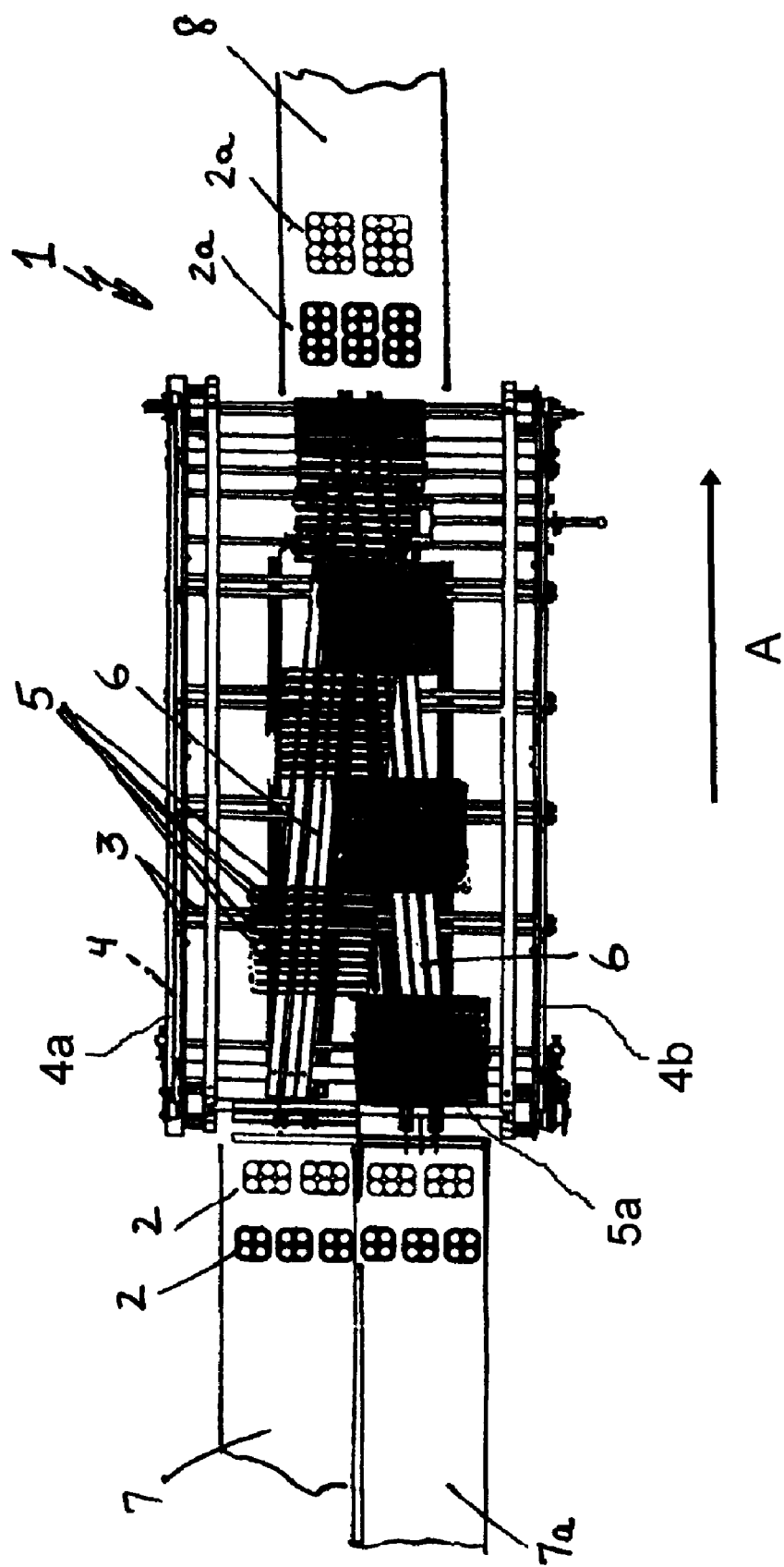
FIG. 1A shows another top plan view of a gathering or conveying arrangement in accordance with the present application.

FIG. 1A shows a conveyor arrangement 1 that groups together bundles or groups of containers 2, such as bottles, boxes or packages, into new bundles or groups of containers or larger bundles or groups of containers 2a. The conveyor arrangement 1 comprises a chain conveyor system 4. The conveyor arrangement has transport members 3 such as poles or rods. These poles or rods 3 are disposed parallel or essentially parallel to one another and perpendicular or essentially perpendicular with respect to the direction of transport or conveyance of the bundles or groups of containers. The poles or rods 3 are driven by chains of a chain conveyor system 4. The chain conveyor system 4 comprises at least one chain 4a. The at least one chain 4a is disposed on one side of the conveyor arrangement 1. The chain 4a is configured to be rotated in the direction of transport A. The chain conveyor system 4 may also comprise a second chain 4b. The chain 4b is disposed on the side of conveyor system 1 opposite the side on which the chain 4a is disposed. The chain 4b is configured to be rotated in the direction of transport A.

The chain conveyor system 4 is configured to engage each of the poles or rods 3. As the chain 4a of chain conveyor system 4 rotates, each pole or rod 3 is driven by the chain 4a.

The carrier plates 5 may be positioned on or between the poles or rods 3, to permit the carrier plates 5 to also be moved transversely to the direction of transport. The carrier plates 5 comprise guides 6 that are positioned at an angle with respect to one another. These guides 6 may comprise rails or tracks. The carrier plates 5 are configured to be moved from a first position, adjacent the upstream conveyors 7 and/or 7a and adjacent the chain conveyor system 4, into a second position, disposed farther from the chain conveyor system 4 than in the first position and adjacent the downstream conveying path 8. The carrier plates 5 are designed to transport the bundles or groups of containers 2 in the direction of transport as the carrier plates 5 simultaneously or substantially simultaneously move toward the center of the conveyor arrangement 1 in a direction transverse to the direction of transport. As a result, the bundles or groups of containers 2 that travel from upstream conveyors 7 and 7a in the direction of transport move forward in an angled direction toward one another. Therefore, the bundles or groups of containers 2 move on two conveyor paths that merge into a single conveyor path. As a result, the plurality of bundles or groups of containers 2 may be pushed together as the bundles or groups of containers 2 exit out of the upstream conveyor path 7 or 7a into the downstream conveying path 8. The plurality of new bundles or groups of containers 2a continues to move downstream of the conveyor arrangement 1.

In FIG. 2 is shown how the plurality of containers, or bundles or groups of containers 2 is conveyed from the feeder conveyer 7a (this conveyer 7a being illustrated in FIG. 2 to be located in a lower feeder position) to the continuing path of conveyer system or transport path 8, by way of one closed group of simultaneously guided carrier plates 5, whereby in accordance with the state of the art, each carrier plate 5 comprises a guide means directed towards the interior of the device 1, such that the arising transport path has the skewed configuration that is illustrated in FIG. 2. In the lower portion of the conveyer system this closed group can be, as it were, undone, or opened and the carrier plates can possibly be repositioned into a new position, so that, e.g., from the upper feeder 7, that is not illustrated in FIG. 2, several products can be taken and further transported.

In other words, and in accordance with at least one possible embodiment of the present application, in FIG. 2 the plurality of bundles or groups of containers 2 is designed to move from the upstream conveyor path 7a to the downstream conveyor path 8. The plurality of bundles or groups of containers 2 may be transported by one closed group of simultaneously or substantially simultaneously guided carrier plates 5, or a carrier plate area 5a. Each carrier plate 5 comprises a guide or other guide structure 6 configured to guide each carrier plate 5 towards the center of the conveyor arrangement 1. Thus, as shown in FIG. 2, the transport path of the carrier plates 5 is not parallel or is not essentially parallel to the length of the conveyor arrangement 1, that is, the transport path of the carrier plates 5 is at an angle to the length of the conveyor arrangement. The carrier plates 5 are designed to be moved in the direction of transport as they simultaneously or substantially simultaneously are moved toward the center of the conveyor arrangement 1. When the carrier plate areas 5a move further downstream, the carrier plates 5 of these carrier plate areas 5a may be disconnected from one another, and may be regrouped and reconnected into other carrier plate areas 5a so as to transport bundles or groups of containers 2 moving from the upstream conveyor 7 in the direction of transport. For example, several bundles or groups of containers 2 may be further transported from upstream conveyor path 7 toward downstream conveyor path 8 upon other carrier plate areas 5a, which is not illustrated in FIG. 2.

Without limiting the present application in detail to these arrangements, FIG. 3 illustrates portions, or end portions of the carrier plates 5 which are positioned atop the conveyor poles or rods 3, i.e., in a manner that permits shifting, or movement of the carrier plates 5; with one carrier plate being identified by reference numeral 5a in FIG. 3, which carrier plate 5a comprises a central drilling, or bore 9 for the purpose, upon insertion of a guide plug 10, of fastening the carrier plate 5a in reference to a u-profiled guide rail, or track rail 6, in such a way that the group of carrier plates, by means of the track rail 6, can be shifted in lateral direction. This movement possibility is indicated by a double-headed arrow 12.

In other words, and in accordance with at least one possible embodiment of the present application, FIG. 3 shows portions or end portions of the carrier plates 5 that are disposed on top of the conveyor poles or rods. The poles or rods 3 are designed to allow movement of the carrier plates 5. One carrier plate 5 is identified by reference numeral 5a in FIG. 3. The carrier plate 5a comprises a central drilling or bore 9. A guide plug 10 may be inserted, through the central bore 9 to permit the carrier plate 5a to engage with a u-profiled guide rail or track rail 6. In this way, the carrier plate area 5a, by means of the interaction of the guide plug 10 with the guide rail 6, may be shifted in a transverse direction, or perpendicular or substantially perpendicular to the direction of transport as shown by a double-headed arrow 12.

So that the full group comprising a predetermined number of carrier plates 5 can follow this forced, or guided movement the individual carrier plates 5 are fixed according to desired number by way of means that positively connect the plates with respect to one another at least for the relevant transport path, or transportation length, with these connecting means being schematically identified by the reference numerals 13a, 13b, or 13c.

In other words, and in accordance with at least one possible embodiment of the present application, the individual carrier plates 5 are configured to be connected according to a predetermined number of carrier plates 5, so that a group comprised of a predetermined number of carrier plates 5 may be guided by the guide rails or track rails 6. This group, or carrier plate area 5a, may be guided by the guide rails 6. The connecting structures that attach the carrier plates 5 are being schematically identified by the reference numerals 13a, 13b, or 13c.

At this point it should be noted, that the fastening means 13 to 13b in FIG. 3 merely illustrate examples in a schematic way; here other means can also be used, possibly hook means that can be swung into the longitudinal frontal sides, or such like connecting means.

In other words, and in accordance with at least one possible embodiment of the present application, it should be noted here that the connecting means or fastening structures 13, 13a and 13b shown in FIG. 3, are only examples. Other connecting means or fastening structures such as hooks, or objects of similar structure, may be used.

In FIG. 4, it is further indicated that, for example, instead of a track plug 10 there may be employed a guide arm structure 14 that is configured to be disposed with an effective portion in the guide rails, or track rails 6, say by swinging of the guide arm structure 14, which guide arm structure 14, for instance, permits automatic turning and swiveling of the guide arm structure 14 into an operative position, or engagement, and out of an operative position, or engagement, for example, in the event that a mechanical gripper means cooperates with a pertaining swing insert, or formation 15; and during further movement of the group, in the direction as is indicated by arrow 16, the position of the swing insert 15 is reversed as is indicated by the direction of arrow 11; and in the identical way a return movement, or swinging is possible for those transport plates 5 which are coupled together into the respective group.

In other words, and in accordance with at least one possible embodiment of the present application, FIG. 4 shows that, instead of a track plug 10, a guide arm structure 14 may be used. The guide arm structure 14 has a projecting guide portion 15 which projects into or against or adjacent the guide rails or track rails 6. When the guide arm structure 14 swings, this permits the guide arm structure 14 to automatically turn in or out of an engaging position. permitting the carrier plate area 5a to move. The projecting guide portion 15, turning in the reverse direction of the guide arm structure 14, can move the guide arm structure 14 and engage the guide rails 6. The engagement of the projecting guide portion 15 allows the carrier plate area 5a to move.

For the automation of the operating process there can be provided markings, e.g., a barcode 17, at the frontal sides of every carrier plate 5 which markings can be read by a reader 18 into a data processing program so as to support the further automatic control of the arrangement.

In other words, and in accordance with at least one possible embodiment of the present application, for the automation of the operating process, there may be markings such as a barcode 17 on the frontal sides of every carrier plate 5. This barcode 17 comprises markings that can be read by a reader 18 into a data processing program, for the further automatic control of the arrangement.

Figure 5:
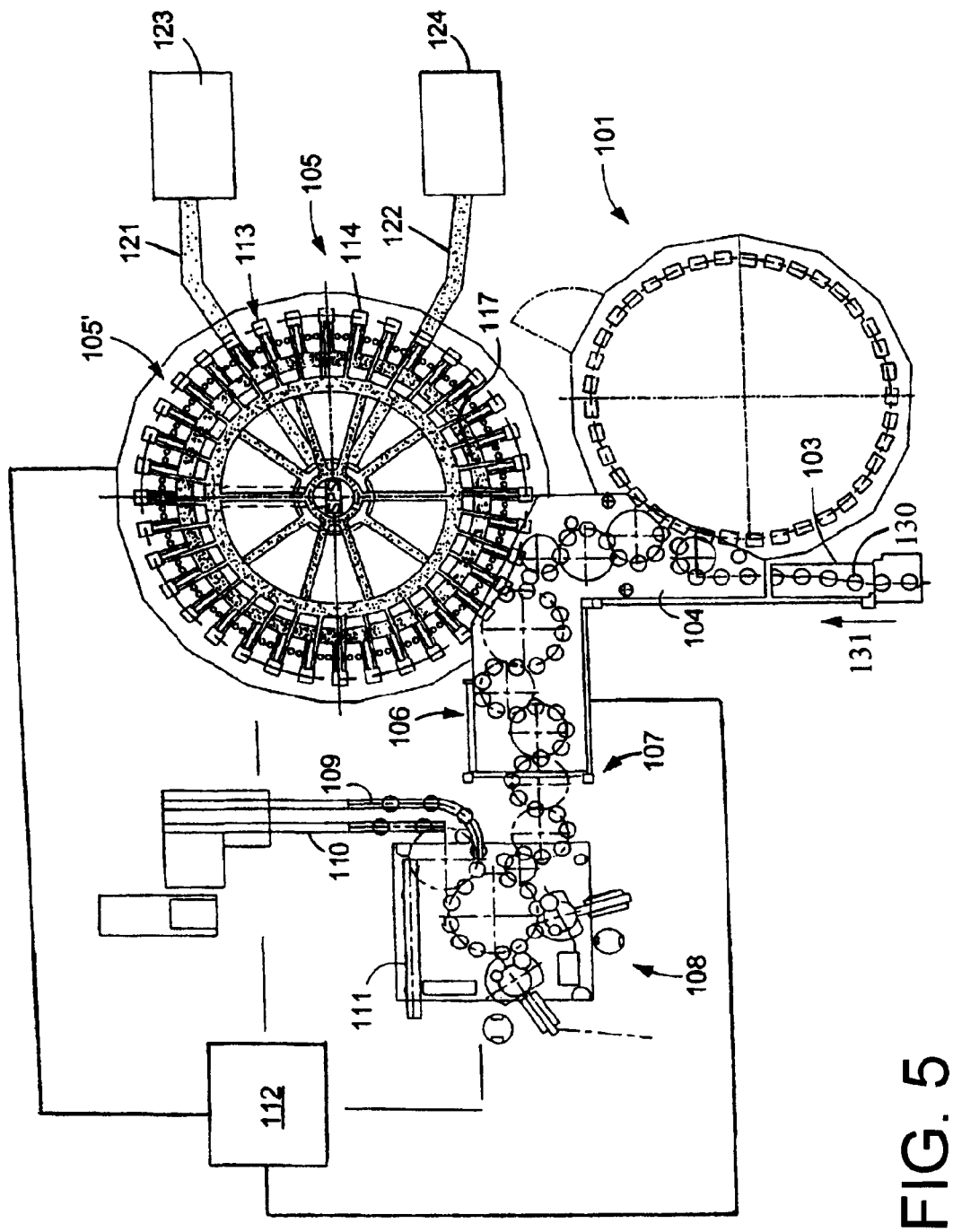
FIG. 5 shows schematically the main components of one possible embodiment example of a system for filling containers, specifically, a beverage bottling plant for filling bottles with at least one liquid beverage, in accordance with at least one possible embodiment, in which system or plant could possibly be utilized at least one aspect, or several aspects, of the embodiments disclosed herein.

FIG. 5 shows schematically the main components of one possible embodiment example of a system for filling containers, specifically, a beverage bottling plant for filling bottles 130 with at least one liquid beverage, in accordance with at least one possible embodiment, in which system or plant could possibly be utilized at least one aspect, or several aspects, of the embodiments disclosed herein.

FIG. 5 shows a rinsing arrangement or rinsing station 101, to which the containers, namely bottles 130, are fed in the direction of travel as indicated by the arrow 131, by a first conveyer arrangement 103, which can be a linear conveyor or a combination of a linear conveyor and a starwheel. Downstream of the rinsing arrangement or rinsing station 101, in the direction of travel as indicated by the arrow 131, the rinsed bottles 130 are transported to a beverage filling machine 105 by a second conveyer arrangement 104 that is formed, for example, by one or more starwheels that introduce bottles 130 into the beverage filling machine 105.

The beverage filling machine 105 shown is of a revolving or rotary design, with a rotor 105', which revolves around a central, vertical machine axis. The rotor 105' is designed to receive and hold the bottles 130 for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles 130 to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 5, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle 130, the first product or the second product can be filled by means of an appropriate control of the filling product or fluid valves.

Downstream of the beverage filling machine 105, in the direction of travel of the bottles 130, there can be a beverage bottle closing arrangement or closing station 106 which closes or caps the bottles 130. The beverage bottle closing arrangement or closing station 106 can be connected by a third conveyer arrangement 107 to a beverage bottle labeling arrangement or labeling station 108. The third conveyor arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles 130. In the embodiment shown, the labeling arrangement 108 is connected by a starwheel conveyer structure to three output conveyer arrangements: a first output conveyer arrangement 109, a second output conveyer arrangement 110, and a third output conveyer arrangement 111, all of which convey filled, closed, and labeled bottles 130 to different locations.

The first output conveyer arrangement 109, in the embodiment shown, is designed to convey bottles 130 that are filled with a first type of liquid beverage supplied by, for example, the supply reservoir 123. The second output conveyer arrangement 110, in the embodiment shown, is designed to convey bottles 130 that are filled with a second type of liquid beverage supplied by, for example, the supply reservoir 124. The third output conveyer arrangement 111, in the embodiment shown, is designed to convey incorrectly labeled bottles 130. To further explain, the labeling arrangement 108 can comprise at least one beverage bottle inspection or monitoring device that inspects or monitors the location of labels on the bottles 130 to determine if the labels have been correctly placed or aligned on the bottles 130. The third output conveyer arrangement 111 removes any bottles 130 which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

Of course, the described embodiment examples of the present application may be changed still in many various regards without leaving the basic idea, or teaching of the present application. If there is provided, for instance, a plurality of parallel or essentially parallel arranged guide rails 6, more than one of the carrier plates can also comprise guide elements for the active lateral shifting, which guide elements can be swung into the various guide rails 6 so as to essentially ensure or promote lateral movement, in one possible embodiment, of heavy objects to be transported, without or essentially without disturbances.

With a device 1 for bringing together of a plurality of containers, or bundles or groups of containers 2, as for example, packaging units, small containers, support trays, or such like receptacles there is to be provided the solution by means of which, for one, turning of the conveyed object is avoided, restricted, and/or minimized between the point of delivery onto the gathering device and the subsequent delivery onto the downstream transport device and, at the same time, an easy adaptation to a plurality of differently sized containers, or bundles or groups of containers to be processed is substantially essentially ensured or promoted.

This is reached by the fact that at least one part of the carrier plates 5 is provided with replaceable intervention elements 10, 14 that are configured to be operatively disposed into the guide rails 6 and that adjacent carrier plates 5 are equipped with fastening means 13 for securing the plates 5 so as to configure larger carrier plates units adjacent to each other.

In a conveyor arrangement 1 in accordance with at least one possible embodiment of the present application, as shown in FIG. 1, in operation the products 2 essentially are maintained in the same desired orientation with respect to one another as they move on their conveyor paths 7 or 7a. To accomplish this, a predetermined number of carrier plates 5 are attached to one another by fastening structures 13, such as clamps, as shown in FIG. 3, and thus form a carrier plate area 5a to transport the products 2 downstream. At least one part of the carrier plates 5 comprises plugs 10 that engage the guide rails 6. The carrier plates 5 transport the products 2 in the direction of transport as the carrier plates 5 simultaneously or substantially simultaneously move toward the center of the conveyor arrangement 1 in a direction transverse to the direction of transport. As a result, the products 2 are moved in an angled direction toward one another essentially without changing the orientation of the products 2 with respect to one another. The products 2 are maintained in essentially the same orientation with respect to one another on the carrier plates 5 from the point of entry into the merge area, through the merging of the two conveyor paths 7 or 7a in the merge area, to the point of exit out of the merge area into a single downstream conveyor path 8.

At the same time, the attachment of the carrier plates 5 substantially ensures the easy transition between the conveying of the bundles or groups of containers 2 of one size and the bundles or groups of containers 2 of another size. The carrier plates 5 that are adjacent to one another are attached to one another so that the carrier plates 5 form larger transport units, or carrier plate areas 5a. Each carrier plate area 5a comprises a plurality of carrier plates 5. The plurality of carrier plates 5 are fastened together to produce carrier plate areas 5a of a desired or predetermined size or length. In one possible embodiment, for example, one carrier plate area 5a may comprise five adjacent carrier plates 5. In another possible embodiment, for example, one carrier plate area 5a may comprise ten carrier plates 5. However, other possible embodiments of the carrier plate area 5a may comprise any other number of carrier plates 5. Therefore, the attachment of the carrier plates 5, to form the carrier plate areas 5a of various predetermined sizes, ensures or substantially ensures that the conveyor arrangement 1 can be used for the transport of bundles or groups of containers 2 of many various sizes.

One feature or aspect of an embodiment is believed at the time of the filing of this patent application to possibly reside broadly in a device 1 for bringing together of a plurality of containers, or bundles 2, such as for instance, packaging units, small containers, carrier trays, or such like receptacles, with at least two conveying paths 7, 7a that feed the plurality of containers, or bundles 2 to be brought together to the device 1 and a conveying path 8 for transporting the plurality of containers, or bundles 2 from the device 1, and the device 1 being provided with poles 3 that are operated by a chain arrangement, with the chains being disposed at the outer sides and continuously circulating, and with on and/or between the poles 3 arranged, adjustable carrier plates 5, and between the upper portion of the chain arrangement and the lower portion of the chain arrangement of the circulating chain conveyor and pole conveyer, there are arranged guide rails, or the like guide structures 6 that are configured for carrying out a transverse movement of the individual carrier plates 5, wherein at least a portion of the carrier plates 5 is provided with replaceable intervention elements 10, 14 that are configured to be operatively disposed in the guide rails 6 and that adjacent carrier plates 5 are equipped with fastening means 13 for the formation at one another of larger carrier plate units.

Another feature or aspect of an embodiment is believed at the time of the filing of this patent application to possibly reside broadly in the device, wherein at the carrier plates 5 the replaceable intervention elements comprise plugs 10 configured to be disposed in guide rails 6 that have a substantially u-shaped cross-section.

Yet another feature or aspect of an embodiment is believed at the time of the filing of this patent application to possibly reside broadly in the device wherein the replaceable intervention elements are configured as plugs 10 which can be inserted from the upper side of the carrier plates 5a said insertable plugs 10 comprising a connection head, for instance, a bayonet-like connection element.

Still another feature or aspect of an embodiment is believed at the time of the filing of this patent application to possibly reside broadly in the device wherein the intervention elements comprise guide arm structures 14 that can be swung out from, namely, from the underside of the carrier plates 5, or can be swung back.

A further feature or aspect of an embodiment is believed at the time of the filing of this patent application to possibly reside broadly in the device wherein the guide arm structures 14 comprise formations 15 configured to permit automated swinging in and swinging out.

Another feature or aspect of an embodiment is believed at the time of the filing of this patent application to possibly reside broadly in the device wherein for the purposes of securing of individual carrier plates 5 u-shaped fastening clamps 13 with legs are provided which legs are connectingly secured to neighboring carrier plates 5 for purposes of securing.

Yet another feature or aspect of an embodiment is believed at the time of the filing of this patent application to possibly reside broadly in the device wherein the transverse section of the u-shaped fastening clamp 13 there are provided formations configured to be operatively connected to an operating robot, or the like automating element configured for the implementation of the joining and as well the separating of carrier plates.

Still another feature or aspect of an embodiment is believed at the time of the filing of this patent application to possibly reside broadly in the device wherein every carrier plate 5 is equipped with an individual marking, with a barcode 17, or such like insignia, and that the device comprises a device configured and disposed to grasp the marking, for example, a barcode reader 18, and that a control unit is provided which on the basis of predetermined operational data gather the carrier plates together into individual units and/or which releases carrier plates units.

Another feature or aspect of an embodiment is believed at the time of the filing of this patent application to possibly reside broadly in a beverage bottle conveying arrangement being configured and disposed to convey groups of beverage bottles, said beverage bottle conveying arrangement comprising: an input arrangement comprising at least a first beverage bottle conveyor and a second beverage bottle conveyor; an output arrangement comprising a third beverage bottle conveyor being disposed offset with respect to each of said first and second beverage bottle conveyors; each of said first, second, and third beverage bottle conveyors being configured to convey groups of beverage bottles thereon in an individual stream of 802 groups of beverage bottles; a merging arrangement being disposed between said input arrangement and said output arrangement; said merging arrangement being configured to convey groups of beverage bottles from said first and second beverage bottle conveyors to said third beverage bottle conveyor; said merging arrangement being configured to merge a first stream of groups of beverage bottles of said first beverage bottle conveyor with a second stream of groups of beverage bottles of said second beverage bottle conveyor into a third stream of groups of beverage bottles on said third beverage bottle conveyor; said merging arrangement comprising: a first chain being configured and disposed to be driven in a circulating manner; a second chain being configured and disposed to be driven in a circulating manner; a plurality of rods being disposed between and being connected to said first and second chains; said first and second chains being configured and disposed to move said rods in a transport direction transverse to the length of said rods; a plurality of beverage bottle carrier plates, each being adjustably mounted on a corresponding one of said rods to permit individual movement of said beverage bottle carrier plates along the length of said rods; said first and second chains, said rods, and said plurality of beverage bottle carrier plates together form a circulating, beverage bottle conveyor being configured to convey groups of beverage bottles thereon; a guide rail arrangement being disposed within said circulating, beverage bottle conveyor between said first and second chains; said guide rail arrangement comprising guide rails; said beverage bottle carrier plates comprising fastening structures being configured to detachably connect said beverage bottle carrier plates to one another to permit the formation of beverage bottle carrier plate units comprising a plurality of beverage bottle carrier plates, which connected beverage bottle carrier plates are essentially immovable with respect to one another; said beverage bottle carrier plates being configured to be connected and disconnected to permit the formation of beverage bottle carrier plate units having different sizes and comprising different numbers of beverage bottle carrier plates to permit handling of different-sized groups of beverage bottles; at least one of said beverage bottle carrier plates of each beverage bottle carrier plate unit comprising a guide element being configured to be operatively disposed in a guide rail of said guide rail arrangement to effect a movement of said beverage bottle carrier plate unit along the length of said rods transverse to the transport direction, to thereby permit movement of groups of beverage bottles in a direction transverse to the transport direction while essentially preventing rotation of the groups of beverage bottles from a first orientation to a second orientation different from the first orientation; said beverage bottle carrier plate units comprising at least a first beverage bottle carrier plate unit and a second beverage bottle carrier plate unit being disposed immediately adjacent said first beverage bottle carrier plate unit; said guide rail arrangement being configured and disposed to guide said first and second beverage bottle carrier plate units away from one another upon said first and second beverage bottle carrier plate units being moved toward said input arrangement, to thereby align said first beverage bottle carrier plate unit with said first beverage bottle conveyor, and to align said second beverage bottle carrier plate unit with said second beverage bottle conveyor, to permit said merging arrangement to receive groups of beverage bottles from each of said first and second beverage bottle conveyors; and said guide rail arrangement being configured and disposed to guide said first and second beverage bottle carrier plate units toward one another upon said first and second beverage bottle carrier plate units being moved toward said output arrangement, to thereby align each of said first and second beverage bottle carrier plate units with said third beverage bottle conveyor, to permit said merging arrangement to merge separate groups of beverage bottles from each of said first and second beverage bottle conveyors into merged groups of beverage bottles on said third beverage bottle conveyor.

Yet another feature or aspect of an embodiment is believed at the time of the filing of this patent application to possibly reside broadly in a conveying arrangement being configured and disposed to convey packages or groups of containers, said conveying arrangement comprising: an input arrangement comprising at least a first conveyor arrangement and a second conveyor arrangement; an output arrangement comprising a third conveyor arrangement; each of said first, second, and third conveyor arrangements being configured to convey packages or groups of containers; a merging arrangement being disposed between said input arrangement and said output arrangement; said merging arrangement being configured to convey packages or groups of containers from said first and second conveyor arrangements to said third conveyor arrangement; said merging arrangement being configured to merge packages or groups of containers of said first conveyor arrangement with packages or groups of containers of said second conveyor arrangement into a merged packages or groups of containers in said third conveyor arrangement; said merging arrangement comprising: a first circulating arrangement being configured and disposed to be driven in a circulating manner; a second circulating arrangement being configured and disposed to be driven in a circulating manner; a plurality of elongated members being disposed between and being connected to said first and second circulating arrangements; said first and second circulating arrangements being configured and disposed to move said elongated members in a transport direction transverse to the length of said elongated members; a plurality of carrier plates, each being adjustably mounted on a corresponding one of said elongated members to permit individual movement of said carrier plates along the length of said elongated members; said first and second circulating arrangements, said elongated members, and said plurality of carrier plates together form a circulating conveyor being configured to convey packages or groups of containers thereon; a guide rail arrangement comprising guide rails; said carrier plates comprising fastening structures being configured to detachably connect said carrier plates to one another to form carrier plate units comprising a plurality of carrier plates, which connected carrier plates are substantially immovable with respect to one another; said carrier plates being configured to be connected and disconnected to permit the formation of carrier plate units having different sizes and comprising different numbers of carrier plates to permit handling of different-sized packages or groups of containers; at least one of said carrier plates of each carrier plate unit comprising a guide element being configured to be operatively disposed in a guide rail of said guide rail arrangement to effect a movement of said carrier plate unit along the length of said elongated members transverse to the transport direction, to thereby permit movement of packages or groups of containers in a direction transverse to the transport direction while minimizing rotation of the packages or groups of containers from a first orientation to a second orientation different from the first orientation; said carrier plate units comprising at least a first carrier plate unit and a second carrier plate unit being disposed immediately adjacent said first carrier plate unit; said guide rail arrangement being configured and disposed to guide said first and second carrier plate units away from one another upon said first and second carrier plate units being moved toward said input arrangement, to thereby align said first carrier plate unit with said first conveyor arrangement, and to align said second carrier plate unit with said second conveyor arrangement, to permit said merging arrangement to receive packages or groups of containers from each of said first and second conveyor arrangements; and said guide rail arrangement being configured and disposed to guide said first and second carrier plate units toward one another upon said first and second carrier plate units being moved toward said output arrangement, to thereby align each of said first and second carrier plate units with said third conveyor arrangement, to permit said merging arrangement to merge separate packages or groups of containers from each of said first and second conveyor arrangements into merged packages or groups of containers in said third conveyor arrangement.

A further feature or aspect of an embodiment is believed at the time of the filing of this patent application to possibly reside broadly in the conveying arrangement, wherein: said guide elements comprise removable plugs comprising connection heads; and said removable plugs being configured to be inserted from the upper side of said carrier plates through corresponding openings in said carrier plates and into said guide rails, which guide rails have a substantially u-shaped cross-section.

Another feature or aspect of an embodiment is believed at the time of the filing of this patent application to possibly reside broadly in the conveying arrangement, wherein for the purposes of securing of individual carrier plates, u-shaped fastening clamps with legs are provided which legs are connectingly secured to neighboring carrier plates for purposes of securing two plates together.

Yet another feature or aspect of an embodiment is believed at the time of the filing of this patent application to possibly reside broadly in the conveying arrangement, wherein: in the transverse section of the u-shaped fastening clamp, there are provided formations configured to be operatively connected to an operating robot, or the like automating element configured for the implementation of the joining and as well the separating of carrier plates; each carrier plate is equipped with an individual marking comprising a barcode or similar insignia; said conveying arrangement comprises a detecting device configured and disposed to detect the marking, which said detecting device comprises a barcode reader or similar device; and said conveying arrangement comprises a control unit operatively connected to said detecting device and configured to utilize the data to permit the automated gathering together of said carrier plates into carrier plate units and/or separating of individual carrier plates from said carrier plate units.

Still another feature or aspect of an embodiment is believed at the time of the filing of this patent application to possibly reside broadly in the conveying arrangement, wherein said guide elements comprise movable or pivotable guide arm structures that can be swung out from the underside of the carrier plates into engagement with said guide rails, or can be swung back out of engagement with said guide rails.

A further feature or aspect of an embodiment is believed at the time of the filing of this patent application to possibly reside broadly in the conveying arrangement, wherein: said guide arm structures comprise formations configured to permit automated swinging in and swinging out; and for the purposes of securing of individual carrier plates, u-shaped fastening clamps with legs are provided which legs are connectingly secured to neighboring carrier plates for purposes of securing two plates together.

Another feature or aspect of an embodiment is believed at the time of the filing of this patent application to possibly reside broadly in a method of conveying packages or groups of containers using a conveying arrangement comprising: an input arrangement comprising at least a first conveyor arrangement and a second conveyor arrangement; an output arrangement comprising a third conveyor arrangement; each of said first, second, and third conveyor arrangements being configured to convey packages or groups of containers; a merging arrangement being disposed between said input arrangement and said output arrangement; said merging arrangement being configured to convey packages or groups of containers from said first and second conveyor arrangements to said third conveyor arrangement; said merging arrangement being configured to merge packages or groups of containers of said first conveyor arrangement with packages or groups of containers of said second conveyor arrangement into a merged packages or groups of containers in said third conveyor arrangement; said merging arrangement comprising: a first circulating arrangement being configured and disposed to be driven in a circulating manner; a second circulating arrangement being configured and disposed to be driven in a circulating manner; a plurality of elongated members being disposed between and being connected to said first and second circulating arrangements; said first and second circulating arrangements being configured and disposed to move said elongated members in a transport direction transverse to the length of said elongated members; a plurality of carrier plates, each being adjustably mounted on a corresponding one of said elongated members to permit individual movement of said carrier plates along the length of said elongated members; said first and second circulating arrangements, said elongated members, and said plurality of carrier plates together form a circulating conveyor being configured to convey packages or groups of containers thereon; a guide rail arrangement comprising guide rails; said carrier plates comprising fastening structures being configured to detachably connect said carrier plates to one another to form carrier plate units comprising a plurality of carrier plates, which connected carrier plates are substantially immovable with respect to one another; said carrier plates being configured to be connected and disconnected to permit the formation of carrier plate units having different sizes and comprising different numbers of carrier plates to permit handling of different-sized packages or groups of containers; at least one of said carrier plates of each carrier plate unit comprising a guide element being configured to be operatively disposed in a guide rail of said guide rail arrangement to effect a movement of said carrier plate unit along the length of said elongated members transverse to the transport direction, to thereby permit movement of packages or groups of containers in a direction transverse to the transport direction while minimizing rotation of the packages or groups of containers from a first orientation to a second orientation different from the first orientation; said carrier plate units comprising at least a first carrier plate unit and a second carrier plate unit being disposed immediately adjacent said first carrier plate unit; said guide rail arrangement being configured and disposed to guide said first and second carrier plate units away from one another upon said first and second carrier plate units being moved toward said input arrangement, to thereby align said first carrier plate unit with said first conveyor arrangement, and to align said second carrier plate unit with said second conveyor arrangement, to permit said merging arrangement to receive packages or groups of containers from each of said first and second conveyor arrangements; and said guide rail arrangement being configured and disposed to guide said first and second carrier plate units toward one another upon said first and second carrier plate units being moved toward said output arrangement, to thereby align each of said first and second carrier plate units with said third conveyor arrangement, to permit said merging arrangement to merge separate packages or groups of containers from each of said first and second conveyor arrangements into merged packages or groups of containers in said third conveyor arrangement; said method comprising the steps of: moving a first number of packages or groups of containers of a first size through said conveying arrangement, which said step of moving packages or groups of containers of said first size comprising the steps of: connecting groups of carrier plates to form carrier plate units having a first size and comprising a first number of carrier plates, which first size being sufficient to permit said carrier plate units to transport said packages or groups of containers of a first size thereon while minimizing rotation of the packages or groups of containers from a first orientation to a second orientation different from the first orientation; moving a first stream of packages or groups of containers on said first conveyor arrangement to said merging arrangement, and substantially contemporaneously moving a second stream of packages or groups of containers on said second conveyor arrangement to said merging arrangement; moving a first package or group of containers from said first conveyer arrangement and onto a first carrier plate unit having said first size and then moving said first carrier plate unit in a transport direction away from said first conveyer arrangement toward said third conveyor arrangement, and then moving a second package or group of containers from said second conveyer arrangement and onto a second carrier plate unit having a first size and then moving said second carrier plate unit in said transport direction away from said second conveyer arrangement toward said third conveyor arrangement; guiding at least a first carrier plate of each of said first and second carrier plate units, and thereby guiding each of said carrier plates connected to said first carrier plate, to thus move each of said first and second carrier plate units toward one another in a direction transverse to said transport direction and into alignment with said third conveyer arrangement, upon said first and second carrier plate units being moved in said transport direction; and moving said first package or group of containers from said first carrier plate unit into said third conveyer arrangement and then moving said first carrier plate unit in a return direction away from said third conveyer arrangement back toward said first conveyor arrangement, and then moving said second package or group of containers from said second carrier plate unit into said third conveyer arrangement and then moving said second carrier plate unit in said return direction away from said third conveyer arrangement back toward said second conveyor arrangement, and thereby merging said first package or group of containers and said second package or group of containers into a single stream of containers or packages in said third conveyer arrangement; upon completion of moving said first number of packages or groups of containers of a first size through said conveying arrangement, moving a second number of packages or groups of containers of a second size different from said first size through said conveying arrangement, which said step of moving packages or groups of containers of said second size comprising the steps of: connecting groups of carrier plates to form carrier plate units having a second size different from said first size and comprising a second number of carrier plates different from said first number of carrier plates, which second size being sufficient to permit said carrier plate units to support said packages or groups of containers of a second size thereon while minimizing rotation of the packages or groups of containers from a first orientation to a second orientation different from the first orientation; moving a first stream of packages or groups of containers on said first conveyor arrangement to said merging arrangement, and substantially contemporaneously moving a second stream of packages or groups of containers on said second conveyor arrangement to said merging arrangement; moving a first package or group of containers from said first conveyor arrangement and onto a first carrier plate unit having said second size and then moving said first carrier plate unit in a transport direction away from said first conveyer arrangement toward said third conveyor arrangement, and then moving a second package or group of containers from said second conveyer arrangement and onto a second carrier plate unit having said second size and then moving said second carrier plate unit in said transport direction away from said second conveyer arrangement toward said third conveyor arrangement; guiding at least a first carrier plate of each of said first and second carrier plate units, and thereby guiding each of said carrier plates connected to said first carrier plate, to thus move each of said first and second carrier plate units toward one another in a direction transverse to said transport direction and into alignment with said third conveyer arrangement, upon said first and second carrier plate units being moved in said transport direction; and moving said first package or group of containers from said first carrier plate unit into said third conveyer arrangement and then moving said first carrier plate unit in a return direction away from said third conveyer arrangement back toward said first conveyor arrangement, and then moving said second package or group of containers from said second carrier plate unit into said third conveyer arrangement and then moving said second carrier plate unit in said return direction away from said third conveyer arrangement back toward said second conveyor arrangement, and thereby merging said first package or group of containers and said second package or group of containers into a single stream of containers or packages in said third conveyer arrangement.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

All of the patents, patent applications or patent publications, which were cited in the German Search Report dated Dec. 11, 2007 and/or cited elsewhere are hereby incorporated by reference as if set forth in their entirety herein as follows: JP 2004 026490 A, having the following English translation of the Japanese title "CARRIED ARTICLE CONVERGING DEVICE", published on Jan. 29, 2004; DE 101 45 542 A1, having the following English translation of the German title "APPARATUS FOR MAKING PALLETIZABLE LAYERS", published on Apr. 3, 2003; US 2004/0089514A1, having the following title "LINEAR BELT SORTER AND METHODS OF USING LINEAR BELT SORTER", published on Jun. 13, 2003; and WO 2004/092042A1, having the following title "SLAT SORTATION CONVEYOR", published on Oct. 28 2004.

All of the patents, patent applications or patent publications, which were cited in the International Search Report dated Apr. 18, 2008 and/or cited elsewhere are hereby incorporated by reference as if set forth in their entirety herein as follows: U.S. Pat. No. 3,774,748 A, having the title "MERGING CONVEYOR", published on Nov. 27, 1973; EP 0 492 922 A, having the following title "LANE DIVIDER", published Jul. 1, 1992; U.S. Pat. No. 6,419,073 B1, having the following title "PLATEN FOR DIVERTING CONVEYOR", published on Jul. 16, 2002; U.S. Pat. No. 4,946,022 A, having the following title "ARTICLE SORTING SWITCH", published on Aug. 7, 1990; and U.S. Pat. No. 4,138,008, having the following title "HEAVY DUTY CONVEYOR", published Feb. 6, 1979.

The patents, patent applications, and patent publications listed above in the preceding two paragraphs are herein incorporated by reference as if set forth in their entirety. The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein. The corresponding foreign and international patent publication applications, namely, Federal Republic of Germany Patent Application No. DE 10 2007 001 973.6, filed on Jan. 13, 2007, having inventors Hans-Gerd RIPKENS, Thomas NITSCH, and Josef DUPPER, and DE-OS 10 2007 001 973.6 and DE-PS 10 2007 001 973.6, and International Application No. PCT/EP2007/011005, filed on Dec. 14, 2007 having WIPO Publication No. WO2008/083816 A1 and inventors Hans-Gerd RIPKENS, Thomas NITSCH, and Josef DUPPER, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the corresponding foreign equivalent patent application(s), that is, PCT/EP2007/011005 and German Patent Application DE 10 2007 001 973.6, is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/EP2007/011005 and DE 10 2007 001 973.6 from which this patent application claims priority which do not have to do with the correction of the translation in this patent application are not to be included in this patent application in the incorporation by reference.

Any statements about admissions of prior art in the original foreign patent applications PCT/EP2007/011005 and DE 10 2007 001 973.6 are not to be included in this patent application in the incorporation by reference, since the laws relating to prior art in non-U.S. Patent Offices and courts may be substantially different from the Patent Laws of the United States.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

AT LEAST PARTIAL NOMENCLATURE

| | |
|---|---|
| 1 | Device, arrangement, or station |
| 2 | Plurality of containers, or bundles, or the like receptacles |
| 2a | Other transport unit, downstream bundles, or containers |
| 3 | Poles, slats, bars |
| 4 | Chains |
| 5 | Carrier plates |
| 5a | Carrier plate that has a hole 9 for insertion of a plug |
| 6 | Guide rails and track rails |
| 7 | Path or conveyer configured for feeding items to device 1 |
| 7a | Path or conveyer configured for feeding items to device 1 |
| 8 | Path or conveyer disposed downstream of the device 1 |
| 9 | Drill holes |
| 10 | Track plug, plug |
| 11 | Arrow indicating directions of movement |
| 12 | Double headed arrow pertaining to movements of 5 |
| 13a | Fastening means |
| 13b | Fastening means |
| 13c | Fastening means |
| 14 | Guide arm structure |
| 15 | Formation configured to perform swinging, or turning movement |
| 16 | Arrow pertaining to movement of 15 |
| 17 | Barcodes |
| 18 | Reader |

What is claimed is:

1. A beverage bottle conveying arrangement being configured and disposed to convey groups of beverage bottles, said beverage bottle conveying arrangement comprising:

an input arrangement comprising at least a first beverage bottle conveyor and a second beverage bottle conveyor;

an output arrangement comprising a third beverage bottle conveyor being disposed offset with respect to each of said first and second beverage bottle conveyors;

each of said first, second, and third beverage bottle conveyors being configured to convey groups of beverage bottles thereon in an individual stream of groups of beverage bottles;

a merging arrangement being disposed between said input arrangement and said output arrangement;

said merging arrangement being configured to convey groups of beverage bottles from said first and second beverage bottle conveyors to said third beverage bottle conveyor;

said merging arrangement being configured to merge a first stream of groups of beverage bottles of said first beverage bottle conveyor with a second stream of groups of beverage bottles of said second beverage bottle conveyor into a third stream of groups of beverage bottles on said third beverage bottle conveyor;

said merging arrangement comprising:
a first chain being configured and disposed to be driven in a circulating manner;
a second chain being configured and disposed to be driven in a circulating manner;
a plurality of rods being disposed between and being connected to said first and second chains;
said first and second chains being configured and disposed to move said rods in a transport direction transverse to the length of said rods;
a plurality of beverage bottle carrier plates, each being adjustably mounted on a corresponding one of said rods to permit individual movement of said beverage bottle carrier plates along the length of said rods;
said first and second chains, said rods, and said plurality of beverage bottle carrier plates together form a circulating, beverage bottle conveyor being configured to convey groups of beverage bottles thereon;
a guide rail arrangement being disposed within said circulating, beverage bottle conveyor between said first and second chains;
said guide rail arrangement comprising guide rails;
said beverage bottle carrier plates comprising fastening structures being configured to detachably connect said beverage bottle carrier plates to one another to permit the formation of beverage bottle carrier plate units comprising a plurality of beverage bottle carrier plates, which connected beverage bottle carrier plates are essentially immovable with respect to one another;
said beverage bottle carrier plates being configured to be connected and disconnected to permit the formation of beverage bottle carrier plate units having different sizes and comprising different numbers of beverage bottle carrier plates to permit handling of different-sized groups of beverage bottles;
at least one of said beverage bottle carrier plates of each beverage bottle carrier plate unit comprising a guide element being configured to be operatively disposed in a guide rail of said guide rail arrangement to effect a movement of said beverage bottle carrier plate unit along the length of said rods transverse to the transport direction, to thereby permit movement of groups of beverage bottles in a direction transverse to the transport direction while essentially preventing rotation of the groups of beverage bottles from a first orientation to a second orientation different from the first orientation;
said beverage bottle carrier plate units comprising at least a first beverage bottle carrier plate unit and a second beverage bottle carrier plate unit being disposed immediately adjacent said first beverage bottle carrier plate unit;
said guide rail arrangement being configured and disposed to guide said first and second beverage bottle carrier plate units away from one another upon said first and second beverage bottle carrier plate units being moved toward said input arrangement, to thereby align said first beverage bottle carrier plate unit with said first beverage bottle conveyor, and to align said second beverage bottle carrier plate unit with said second beverage bottle conveyor, to permit said merging arrangement to receive groups of beverage bottles from each of said first and second beverage bottle conveyors; and
said guide rail arrangement being configured and disposed to guide said first and second beverage bottle carrier plate units toward one another upon said first and second beverage bottle carrier plate units being moved toward said output arrangement, to thereby align each of said first and second beverage bottle carrier plate units with said third beverage bottle conveyor, to permit said merging arrangement to merge separate groups of beverage bottles from each of said first and second beverage bottle conveyors into merged groups of beverage bottles on said third beverage bottle conveyor.

2. The beverage bottle conveying arrangement according to claim 1, wherein:
said guide elements comprise removable plugs comprising connection heads; and
said removable plugs being configured to be inserted from the upper side of said carrier plates through corresponding openings in said carrier plates and into said guide rails, which guide rails have a substantially u-shaped cross-section.

3. The beverage bottle conveying arrangement according to claim 2, wherein for the purposes of securing of individual carrier plates, u-shaped fastening clamps with legs are provided which legs are connectingly secured to neighboring carrier plates for purposes of securing two plates together.

4. The beverage bottle conveying arrangement according to claim 3, wherein:
in the transverse section of the u-shaped fastening clamp, there are provided formations configured to be operatively connected to an operating robot, or the like automating element configured for the implementation of the joining and as well the separating of carrier plates;
each carrier plate is equipped with an individual marking comprising a barcode or similar insignia;
said conveying arrangement comprises a detecting device configured and disposed to detect the marking, which said detecting device comprises a barcode reader or similar device; and
said conveying arrangement comprises a control unit operatively connected to said detecting device and configured to utilize the data to permit the automated gathering together of said carrier plates into carrier plate units and/or separating of individual carrier plates from said carrier plate units.

5. The beverage bottle conveying arrangement according to claim 1, wherein:
said guide elements comprise movable or pivotable guide arm structures that can be swung out from the underside of the carrier plates into engagement with said guide rails, or can be swung back out of engagement with said guide rails; and
said guide arm structures comprise formations configured to permit automated swinging in and swinging out.

6. The beverage bottle conveying arrangement according to claim 4, wherein:
for the purposes of securing of individual carrier plates, u-shaped fastening clamps with legs are provided which legs are connectingly secured to neighboring carrier plates for purposes of securing two plates together;
in the transverse section of the u-shaped fastening clamp, there are provided formations configured to be operatively connected to an operating robot, or the like automating element configured for the implementation of the joining and as well the separating of carrier plates;
each carrier plate is equipped with an individual marking comprising a barcode or similar insignia;
said conveying arrangement comprises a detecting device configured and disposed to detect the marking, which said detecting device comprises a barcode reader or similar device; and
said conveying arrangement comprises a control unit operatively connected to said detecting device and configured to utilize the data to permit the automated gathering together of said carrier plates into carrier plate units and/or separating of individual carrier plates from said carrier plate units.

7. A conveying arrangement being configured and disposed to convey packages or groups of containers, said conveying arrangement comprising:
an input arrangement comprising at least a first conveyor arrangement and a second conveyor arrangement;
an output arrangement comprising a third conveyor arrangement;
each of said first, second, and third conveyor arrangements being configured to convey packages or groups of containers; p1 a merging arrangement being disposed between said input arrangement and said output arrangement;
said merging arrangement being configured to convey packages or groups of containers from said first and second conveyor arrangements to said third conveyor arrangement;
said merging arrangement being configured to merge packages or groups of containers of said first conveyor arrangement with packages or groups of containers of said second conveyor arrangement into a merged packages or groups of containers in said third conveyor arrangement;
said merging arrangement comprising:
a first circulating arrangement being configured and disposed to be driven in a circulating manner;
a second circulating arrangement being configured and disposed to be driven in a circulating manner;
a plurality of elongated members being disposed between and being connected to said first and second circulating arrangements;
said first and second circulating arrangements being configured and disposed to move said elongated members in a transport direction transverse to the length of said elongated members;
a plurality of carrier plates, each being adjustably mounted on a corresponding one of said elongated members to permit individual movement of said carrier plates along the length of said elongated members;
said first and second circulating arrangements, said elongated members, and said plurality of carrier plates together form a circulating conveyor being configured to convey packages or groups of containers thereon;
a guide rail arrangement comprising guide rails;
said carrier plates comprising fastening structures being configured to detachably connect said carrier plates to one another to form carrier plate units comprising a plurality of carrier plates, which connected carrier plates are substantially immovable with respect to one another;
said carrier plates being configured to be connected and disconnected to permit the formation of carrier plate units having different sizes and comprising different numbers of carrier plates to permit handling of different-sized packages or groups of containers;
at least one of said carrier plates of each carrier plate unit comprising a guide element being configured to be operatively disposed in a guide rail of said guide rail arrangement to effect a movement of said carrier plate unit along the length of said elongated members transverse to the transport direction, to thereby permit movement of packages or groups of containers in a direction transverse to the transport direction while minimizing rotation of the packages or groups of containers from a first orientation to a second orientation different from the first orientation;

said carrier plate units comprising at least a first carrier plate unit and a second carrier plate unit being disposed immediately adjacent said first carrier plate unit;

said guide rail arrangement being configured and disposed to guide said first and second carrier plate units away from one another upon said first and second carrier plate units being moved toward said input arrangement, to thereby align said first carrier plate unit with said first conveyor arrangement, and to align said second carrier plate unit with said second conveyor arrangement, to permit said merging arrangement to receive packages or groups of containers from each of said first and second conveyor arrangements; and said guide rail arrangement being configured and disposed to guide said first and second carrier plate units toward one another upon said first and second carrier plate units being moved toward said output arrangement, to thereby align each of said first and second carrier plate units with said third conveyor arrangement, to permit said merging arrangement to merge separate packages or groups of containers from each of said first and second conveyor arrangements into merged packages or groups of containers in said third conveyor arrangement.

8. The conveying arrangement according to claim 7, wherein:

said guide elements comprise removable plugs comprising connection heads; and said removable plugs being configured to be inserted from the upper side of said carrier plates through corresponding openings in said carrier plates and into said guide rails, which guide rails have a substantially u-shaped cross-section.

9. The conveying arrangement according to claim 8, wherein for the purposes of securing of individual carrier plates, u-shaped fastening clamps with legs are provided which legs are connectingly secured to neighboring carrier plates for purposes of securing two plates together.

10. The conveying arrangement according to claim 9, wherein:

in the transverse section of the u-shaped fastening clamp, there are provided formations configured to be operatively connected to an operating robot, or the like automating element configured for the implementation of the joining and as well the separating of carrier plates;

each carrier plate is equipped with an individual marking comprising a barcode or similar insignia;

said conveying arrangement comprises a detecting device configured and disposed to detect the marking, which said detecting device comprises a barcode reader or similar device; and said conveying arrangement comprises a control unit operatively connected to said detecting device and configured to utilize the data to permit the automated gathering together of said carrier plates into carrier plate units and/or separating of individual carrier plates from said carrier plate units.

11. The conveying arrangement according to claim 7, wherein said guide elements comprise movable or pivotable guide arm structures that can be swung out from the underside of the carrier plates into engagement with said guide rails, or can be swung back out of engagement with said guide rails.

12. The conveying arrangement according to claim 11, wherein:

said guide arm structures comprise formations configured to permit automated swinging in and swinging out; and for the purposes of securing of individual carrier plates, u-shaped fastening clamps with legs are provided which legs are connectingly secured to neighboring carrier plates for purposes of securing two plates together.

13. The conveying arrangement according to claim 12, wherein:

in the transverse section of the u-shaped fastening clamp, there are provided formations configured to be operatively connected to an operating robot, or the like automating element configured for the implementation of the joining and as well the separating of carrier plates;

each carrier plate is equipped with an individual marking comprising a barcode or similar insignia;

said conveying arrangement comprises a detecting device configured and disposed to detect the marking, which said detecting device comprises a barcode reader or similar device; and said conveying arrangement comprises a control unit operatively connected to said detecting device and configured to utilize the data to permit the automated gathering together of said carrier plates into carrier plate units and/or separating of individual carrier plates from said carrier plate units.

14. A method of conveying packages or groups of containers using a conveying arrangement comprising:

an input arrangement comprising at least a first conveyor arrangement and a second conveyor arrangement;

an output arrangement comprising a third conveyor arrangement;

each of said first, second, and third conveyor arrangements being configured to convey packages or groups of containers;

a merging arrangement being disposed between said input arrangement and said output arrangement;

said merging arrangement being configured to convey packages or groups of containers from said first and second conveyor arrangements to said third conveyor arrangement;

said merging arrangement being configured to merge packages or groups of containers of said first conveyor arrangement with packages or groups of containers of said second conveyor arrangement into a merged packages or groups of containers in said third conveyor arrangement;

said merging arrangement comprising:

a first circulating arrangement being configured and disposed to be driven in a circulating manner;

a second circulating arrangement being configured and disposed to be driven in a circulating manner;

a plurality of elongated members being disposed between and being connected to said first and second circulating arrangements;

said first and second circulating arrangements being configured and disposed to move said elongated members in a transport direction transverse to the length of said elongated members;

a plurality of carrier plates, each being adjustably mounted on a corresponding one of said elongated members to permit individual movement of said carrier plates along the length of said elongated members;

said first and second circulating arrangements, said elongated members, and said plurality of carrier plates together form a circulating conveyor being configured to convey packages or groups of containers thereon;

a guide rail arrangement comprising guide rails;

said carrier plates comprising fastening structures being configured to detachably connect said carrier plates to one another to form carrier plate units comprising a plurality of carrier plates, which connected carrier plates are substantially immovable with respect to one another;

said carrier plates being configured to be connected and disconnected to permit the formation of carrier plate units having different sizes and comprising different numbers of carrier plates to permit handling of different-sized packages or groups of containers;

at least one of said carrier plates of each carrier plate unit comprising a guide element being configured to be operatively disposed in a guide rail of said guide rail arrangement to effect a movement of said carrier plate unit along the length of said elongated members transverse to the transport direction, to thereby permit movement of packages or groups of containers in a direction transverse to the transport direction while minimizing rotation of the packages or groups of containers from a first orientation to a second orientation different from the first orientation;

said carrier plate units comprising at least a first carrier plate unit and a second carrier plate unit being disposed immediately adjacent said first carrier plate unit;

said guide rail arrangement being configured and disposed to guide said first and second carrier plate units away from one another upon said first and second carrier plate units being moved toward said input arrangement, to thereby align said first carrier plate unit with said first conveyor arrangement, and to align said second carrier plate unit with said second conveyor arrangement, to permit said merging arrangement to receive packages or groups of containers from each of said first and second conveyor arrangements; and said guide rail arrangement being configured and disposed to guide said first and second carrier plate units toward one another upon said first and second carrier plate units being moved toward said output arrangement, to thereby align each of said first and second carrier plate units with said third conveyor arrangement, to permit said merging arrangement to merge separate packages or groups of containers from each of said first and second conveyor arrangements into merged packages or groups of containers in said third conveyor arrangement;

said method comprising the steps of:

moving a first number of packages or groups of containers of a first size through said conveying arrangement, which said step of moving packages or groups of containers of said first size comprising the steps of:

connecting groups of carrier plates to form carrier plate units having a first size and comprising a first number of carrier plates, which first size being sufficient to permit said carrier plate units to transport said packages or groups of containers of a first size thereon while minimizing rotation of the packages or groups of containers from a first orientation to a second orientation different from the first orientation;

moving a first stream of packages or groups of containers on said first conveyor arrangement to said merging arrangement, and substantially contemporaneously moving a second stream of packages or groups of containers on said second conveyor arrangement to said merging arrangement;

moving a first package or group of containers from said first conveyer arrangement and onto a first carrier plate unit having said first size and then moving said first carrier plate unit in a transport direction away from said first conveyer arrangement toward said third conveyor arrangement, and then moving a second package or group of containers from said second conveyer arrangement and onto a second carrier plate unit having a first size and then moving said second carrier plate unit in said transport direction away from said second conveyer arrangement toward said third conveyor arrangement;

guiding at least a first carrier plate of each of said first and second carrier plate units, and thereby guiding each of said carrier plates connected to said first carrier plate, to thus move each of said first and second carrier plate units toward one another in a direction transverse to said transport direction and into alignment with said third conveyer arrangement, upon said first and second carrier plate units being moved in said transport direction; and moving said first package or group of containers from said first carrier plate unit into said third conveyer arrangement and then moving said first carrier plate unit in a return direction away from said third conveyer arrangement back toward said first conveyor arrangement, and then moving said second package or group of containers from said second carrier plate unit into said third conveyer arrangement and then moving said second carrier plate unit in said return direction away from said third conveyer arrangement back toward said second conveyer arrangement, and thereby merging said first package or group of containers and said second package or group of containers into a single stream of containers or packages in said third conveyer arrangement;

upon completion of moving said first number of packages or groups of containers of a first size through said conveying arrangement, moving a second number of packages or groups of containers of a second size different from said first size through said conveying arrangement, which said step of moving packages or groups of containers of said second size comprising the steps of:

connecting groups of carrier plates to form carrier plate units having a second size different from said first size and comprising a second number of carrier plates different from said first number of carrier plates, which second size being sufficient to permit said carrier plate units to support said packages or groups of containers of a second size thereon while minimizing rotation of the packages or groups of containers from a first orientation to a second orientation different from the first orientation;

moving a first stream of packages or groups of containers on said first conveyor arrangement to said merging arrangement, and substantially contemporaneously moving a second stream of packages or groups of containers on said second conveyor arrangement to said merging arrangement;

moving a first package or group of containers from said first conveyer arrangement and onto a first carrier plate unit having said second size and then moving said first carrier plate unit in a transport direction away from said first conveyer arrangement toward said third conveyor arrangement, and then moving a second package or group of containers from said second conveyer arrangement and onto a second carrier plate unit having said second size and then moving said second carrier plate unit in said transport direction away from said second conveyer arrangement toward said third conveyor arrangement;

guiding at least a first carrier plate of each of said first and second carrier plate units, and thereby guiding each of said carrier plates connected to said first carrier plate, to thus move each of said first and second carrier plate units toward one another in a direction transverse to said transport direction and into alignment with said third conveyer arrangement, upon said first and second carrier plate units being moved in said transport direction; and moving said first package or group of containers from said first carrier plate unit into said third conveyer arrangement and then moving said first carrier plate unit in a return direction away from said third conveyer arrangement back toward said first conveyor arrangement, and then moving said second package or group of containers from said second carrier plate unit into said third conveyer arrangement and then moving said second carrier plate unit in said return direction away from said third conveyer arrangement back toward said second conveyor arrangement, and thereby merging said first package or group of containers and said second package or group of containers into a single stream of containers or packages in said third conveyer arrangement.

15. The method according to claim 14, wherein:

said guide elements comprise removable plugs comprising connection heads; and said removable plugs being configured to be inserted from the upper side of said carrier plates through corresponding openings in said carrier plates and into said guide rails, which guide rails have a substantially u-shaped cross-section.

16. The method according to claim 15, wherein for the purposes of securing of individual carrier plates, u-shaped fastening clamps with legs are provided which legs are connectingly secured to neighboring carrier plates for purposes of securing two plates together.

17. The method according to claim 16, wherein:

in the transverse section of the u-shaped fastening clamp, there are provided formations configured to be operatively connected to an operating robot, or the like automating element configured for the implementation of the joining and as well the separating of carrier plates;

each carrier plate is equipped with an individual marking comprising a barcode or similar insignia;

said conveying arrangement comprises a detecting device configured and disposed to detect the marking, which said detecting device comprises a barcode reader or similar device; and said conveying arrangement comprises a control unit operatively connected to said detecting device and configured to utilize the data to permit the automated gathering together of said carrier plates into carrier plate units and/or separating of individual carrier plates from said carrier plate units.

18. The method according to claim 14, wherein said guide elements comprise movable or pivotable guide arm structures that can be swung out from the underside of the carrier plates into engagement with said guide rails, or can be swung back out of engagement with said guide rails.

19. The method according to claim 18, wherein:

said guide arm structures comprise formations configured to permit automated swinging in and swinging out; and for the purposes of securing of individual carrier plates, u-shaped fastening clamps with legs are provided which legs are connectingly secured to neighboring carrier plates for purposes of securing two plates together.

20. The method according to claim 19, wherein:

in the transverse section of the u-shaped fastening clamp, there are provided formations configured to be operatively connected to an operating robot, or the like automating element configured for the implementation of the joining and as well the separating of carrier plates;

each carrier plate is equipped with an individual marking comprising a barcode or similar insignia;

said conveying arrangement comprises a detecting device configured and disposed to detect the marking, which said detecting device comprises a barcode reader or similar device; and said conveying arrangement comprises a control unit operatively connected to said detecting device and configured to utilize the data to permit the automated gathering together of said carrier plates into carrier plate units and/or separating of individual carrier plates from said carrier plate units.

* * * * *

UNITED STATES PATENT AND TRADEMARK OFFICE
CERTIFICATE OF CORRECTION

PATENT NO.        : 7,921,984 B2
APPLICATION NO.   : 12/499985
DATED             : April 12, 2011
INVENTOR(S)       : Hans-Gerd Ripkens, Thomas Nitsch and Josef Düpper Page 1 of 1

It is certified that error appears in the above-identified patent and that said Letters Patent is hereby corrected as shown below:

Column 26, line 13, Claim 7, after "tainers;" delete "p1", and begin a new sub-paragraph with "a merging".

Signed and Sealed this
Twentieth Day of December, 2011

David J. Kappos
*Director of the United States Patent and Trademark Office*